US012632549B2

(12) United States Patent
Mason

(10) Patent No.: US 12,632,549 B2
(45) Date of Patent: May 19, 2026

(54) DETECTING MALWARE BY MODIFYING EXECUTABLE CODE

(71) Applicant: Google LLC, Mountain View, CA (US)

(72) Inventor: Joshua Aaron Mason, Oklahoma City, OK (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/673,304

(22) Filed: May 23, 2024

(65) Prior Publication Data

US 2025/0363214 A1      Nov. 27, 2025

(51) Int. Cl.
*G06F 21/56*           (2013.01)

(52) U.S. Cl.
CPC .................................. *G06F 21/563* (2013.01)

(58) Field of Classification Search
CPC ........ G06F 21/563; G06F 21/52; G06F 21/54; G06F 21/566; G06F 21/56; G06F 21/577; G06F 2221/033
See application file for complete search history.

(56) References Cited

U.S. PATENT DOCUMENTS

| | | | | |
|---|---|---|---|---|
| 8,522,225 | B2 * | 8/2013 | Chen ........................ | G06F 8/433 |
| | | | | 717/133 |
| 9,003,384 | B2 * | 4/2015 | Pizlo ........................ | G06F 8/443 |
| | | | | 717/136 |
| 9,817,763 | B2 * | 11/2017 | Robertson ........... | G06F 12/0873 |
| 9,916,144 | B2 * | 3/2018 | Chen ................... | G06F 9/30054 |
| 9,928,068 | B2 * | 3/2018 | Alapati ................. | G06F 9/3844 |
| 10,860,716 | B2 * | 12/2020 | Saldanha ............ | G06F 11/3624 |
| 11,288,075 | B2 * | 3/2022 | Degioanni ................ | G06F 9/32 |
| 11,711,201 | B2 * | 7/2023 | Weiler ................ | G06F 12/1408 |
| | | | | 713/168 |
| 12,045,322 | B2 * | 7/2024 | Gupta ..................... | G06F 21/54 |
| 12,093,369 | B2 * | 9/2024 | Frydrych ................ | G06F 21/52 |
| 2021/0351922 | A1 | 11/2021 | Schat et al. | |

OTHER PUBLICATIONS

Botacin, M., et al. "RevEngE is a dish served cold: Debug-Oriented Malware Decompilation and Reassembly", ROOTS 19, 2019, Vienna, 12 pages.
Kolbitsch, C., et al., "The Power of Procrastination: Detection and Mitigation of Execution-Stalling Malicious Code", In Proceedings of the 18th ACM conference on Computer and communications security (pp. 285-296), Oct. 2011.

* cited by examiner

*Primary Examiner* — Hosuk Song
(74) *Attorney, Agent, or Firm* — Lowenstein Sandler LLP

(57)           ABSTRACT

A method for detecting malware by modifying executable code includes identifying executable code that includes branch instructions. The method includes determining whether any of the branch instructions of the executable code mask maliciousness of the executable code. The determining includes modifying first one or more of the branch instructions of the executable code, causing execution of the executable code with the modified first one or more branch instructions in a first testing environment, and evaluating a result of the execution of the executable code with the modified first one or more branch instructions. The result can indicate whether the executable code is malicious. The method includes, responsive to determining that the branch instructions of the executable code mask the maliciousness of the executable code, performing one or more preventative actions with respect to the executable code.

20 Claims, 8 Drawing Sheets

```
700 start:
    ...
    mov eax,ebx          702
    cmp eax,ecx          704
    jne malicious_code   706
    ...
malicious_code:
    [malicious operations]  708
```

```
600 start:
    ...
    mov eax,ebx          602
    cmp eax,ecx          604
    je malicious_code    606
    ...
malicious_code:
    [malicious operations]  608
```

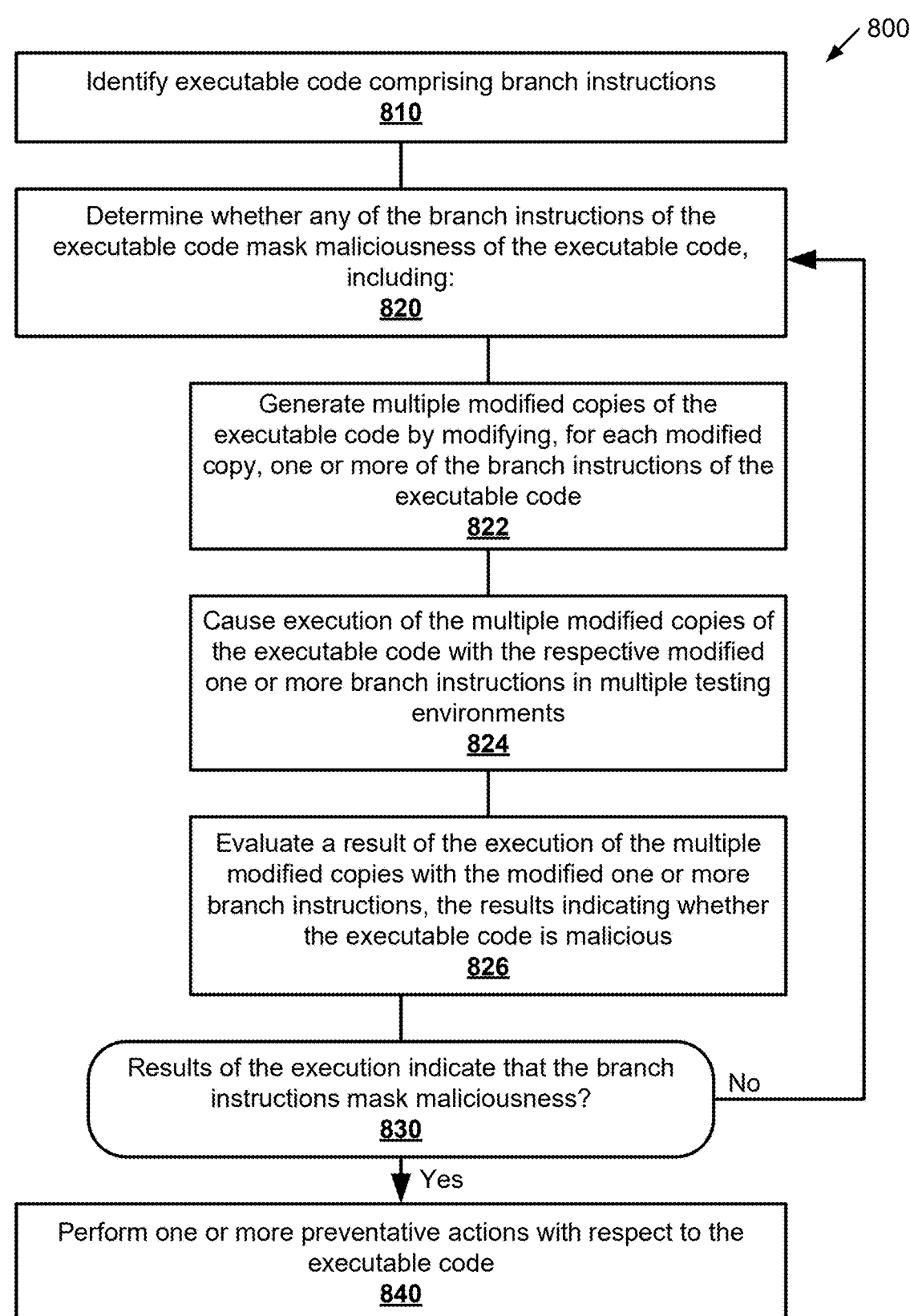

800

Identify executable code comprising branch instructions
810

Determine whether any of the branch instructions of the executable code mask maliciousness of the executable code, including:
820

Generate multiple modified copies of the executable code by modifying, for each modified copy, one or more of the branch instructions of the executable code
822

Cause execution of the multiple modified copies of the executable code with the respective modified one or more branch instructions in multiple testing environments
824

Evaluate a result of the execution of the multiple modified copies with the modified one or more branch instructions, the results indicating whether the executable code is malicious
826

Results of the execution indicate that the branch instructions mask maliciousness?
830

No

Yes

Perform one or more preventative actions with respect to the executable code
840

FIG. 8

DETECTING MALWARE BY MODIFYING EXECUTABLE CODE

TECHNICAL FIELD

The instant specification generally relates to computer security. More specifically, the instant specification relates to detecting malware by modifying executable code.

BACKGROUND

Malicious software ("malware") is a pervasive threat to computer systems and networks. Malware can cause harm, disrupt operations, steal data, or otherwise compromise security. Malware encompasses a wide range of threats, including viruses, worms, Trojan horses, ransomware, and spyware. Each type operates differently, but all share the potential to inflict significant damage on individuals and organizations alike. Traditional methods of protection, such as anti-virus software, offer some protection, but malicious actors are constantly developing new and sophisticated malware strains, necessitating ongoing innovation in detection and prevention strategies. Identifying and preventing the execution of malware in a timely and proactive manner are crucial steps in maintaining the resilience and security of modern computing systems.

SUMMARY

Disclosed herein are systems and methods for detecting malware by modifying executable code. One aspect of the disclosure includes a method. The method includes identifying executable code that includes branch instructions. The method includes determining whether any of the branch instructions of the executable code mask maliciousness of the executable code. The determining includes modifying first one or more of the branch instructions of the executable code, causing execution of the executable code with the modified first one or more branch instructions in a first testing environment, and evaluating a result of the execution of the executable code with the modified first one or more branch instructions. The result can indicate whether the executable code is malicious. The method includes, responsive to determining that the branch instructions of the executable code mask the maliciousness of the executable code, performing one or more preventative actions with respect to the executable code.

Another aspect of the disclosure includes a system. The system includes a memory and a processing device coupled to the memory. The processing device is configured to perform operations. The operations include identifying executable code that includes branch instructions. The operations include determining whether any of the branch instructions of the executable code mask maliciousness of the executable code. The determining includes modifying first one or more of the branch instructions of the executable code, causing execution of the executable code with the modified first one or more branch instructions in a first testing environment, and evaluating a result of the execution of the executable code with the modified first one or more branch instructions. The result can indicate whether the executable code is malicious. The operations include, responsive to determining that the branch instructions of the executable code mask the maliciousness of the executable code, performing one or more preventative actions with respect to the executable code.

Another aspect of the disclosure includes a method. The method includes identifying executable code that includes branch instructions. The method includes determining whether any of the branch instructions of the executable code mask maliciousness of the executable code. The determining includes generating multiple modified copies of the executable code by modifying, for each modified copy of the executable code, one or more of the branch instructions of the executable code. The determining includes causing execution of the multiple modified copies of the executable code with the respective modified one or more branch instructions in multiple testing environments. The determining includes evaluating results of the execution of the multiple modified copies of the executable code with the respective modified one or more branch instructions. The results can indicate whether the executable code is malicious. The method includes, responsive to determining that the branch instructions of the executable code mask the maliciousness of the executable code, performing one or more preventative actions with respect to the executable code.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 8 is a flowchart illustrating an example method for detecting malware by modifying executable code, in accordance with some implementations of the present disclosure.

DETAILED DESCRIPTION

Figure 1:
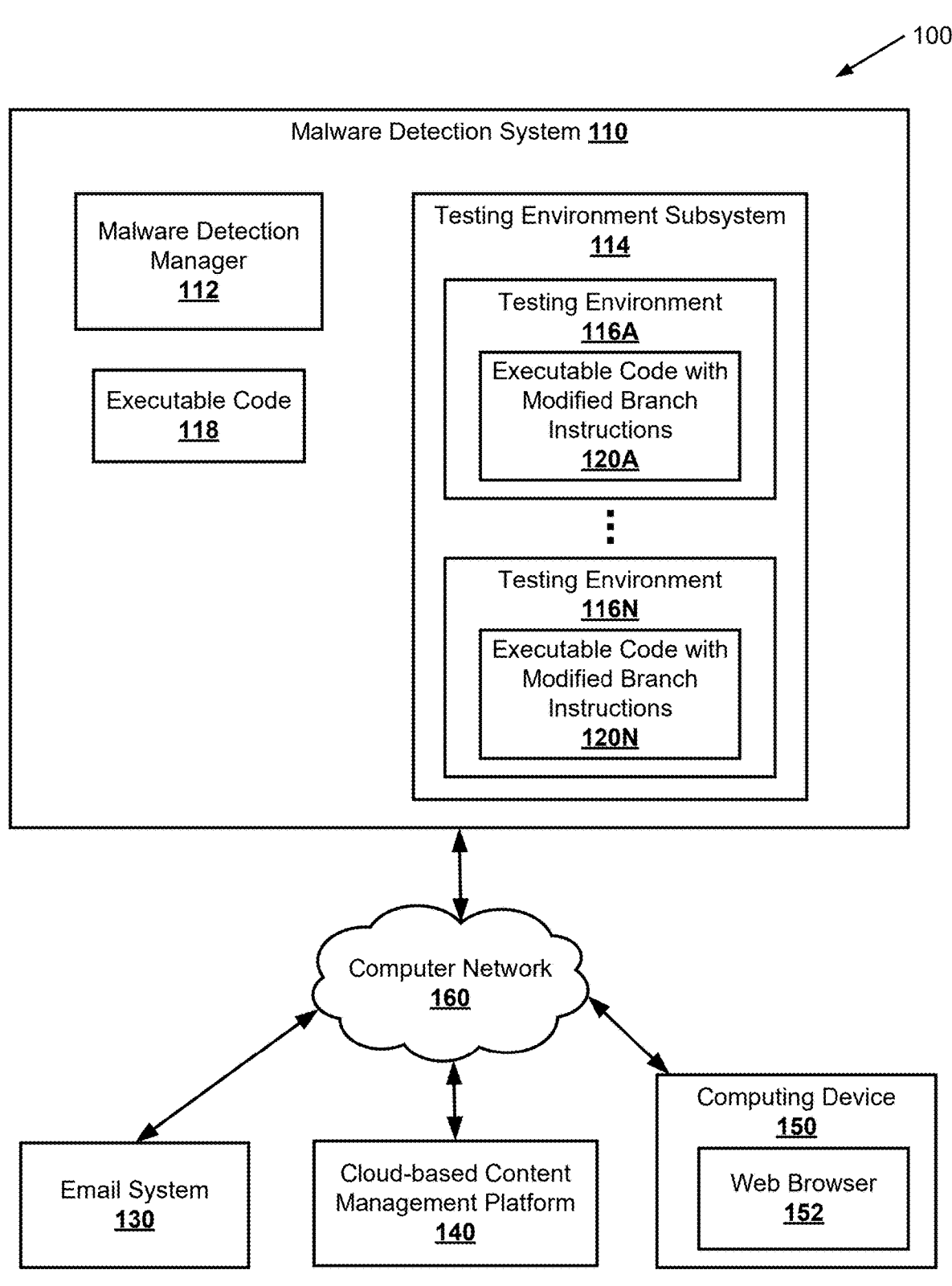
FIG. 1 is a schematic block diagram illustrating an example system for detecting malware by modifying executable code, in accordance with some implementations of the present disclosure.

Conventional methods for detecting malware include allowing executable code (e.g., an executable file) that possibly contains malware to execute in a controlled environment. The controlled environment can be a computing environment that is configured such that if malware executes in the controlled environment, the malware cannot negatively affect components outside the controlled environment. The execution of the executable code is then monitored. If malicious operations are detected (e.g., deleting files, attempting to access confidential data, attempting to communicate with a remote computing device over a network, etc.) during the observation, then it is highly likely that the executable code contains malware.

However, there are many reasons why executable code that contains malware may mask its malicious behavior during observation in the controlled environment. In one example, the malware may detect that it is executing in the controlled environment and may forego executing its malicious operations in order to avoid detection. In another example, the malware may detect that it is being observed for malicious operations and may forego executing its malicious operations in order to avoid detection. In some cases, the malware may not exhibit malicious operations because it is waiting to receive an instruction from a remote computing device over a network (e.g., the executable code may be a distributed denial-of-service (DDoS) client waiting to receive attack instructions from a DDoS host), and the controlled environment may not have network access or may have limited network access. Because of these and other reasons, the executable code may not exhibit malicious behavior, and the entity observing the executable code may incorrectly determine that the executable code does not contain malware.

Aspects and implementations of the present disclosure address the above deficiencies, among others, by providing a malware detection system that can detect malware even if the malware is configured to mask its malicious operations and avoid detection when being observed. The malware detection system of the present disclosure can identify executable code. The executable code may contain malware. The executable code may include one or more branch instructions. The branch instructions can cause the executable code to operate differently depending on conditions detected by the executable code. The malware detection system can determine whether any of the branch instructions mask the maliciousness of the executable code by performing one or more designated operations. The designated operations include modifying one or more of the branch instructions of the executable code. For example, the malware detection system can modify a jump-if-equal instruction to be a jump-if-not equal instruction. This can cause the modified executable code to operate differently than as first configured. The malware detection system can cause execution of the executable code with the modified one or more branch instructions in a testing environment. The malware detection system can evaluate a result of the execution of the executable code with the modified one or more branch instructions in the testing environment, and the result can indicate whether the executable code is malicious. For example, the result may include observing that the executable code with the modified one or more branch instructions, when executed, attempted to access a password file used by the operating system of the testing environment, which may indicate that the branch instructions of the executable code are masking the maliciousness of the executable code. Responsive to determining that the branch instructions mask the maliciousness of the executable code, the malware detection system performs one or more preventative actions with respect to the executable code (e.g., alerting a relevant user that the executable code contains malware; preventing the executable code from being executed, downloaded, etc.; or some other preventative action).

By modifying executable code that possibly contains malware by changing branch instructions in the executable code, the malware detection systems of the present disclosure can force the use of different execution paths through the executable code and, thus, can force the executable code to perform malicious operations programmed into the executable code that otherwise would not have executed while the executable code is being observed. The malware detection system can repeatedly modify the original executable code to change different branch instructions during each modification in order to expand code coverage and increase the possibility of the executable code that results in malicious operations.

In addition, some benefits of the present disclosure may provide a technical effect caused by or resulting from a technical solution to a technical problem. For example, one technical problem may relate to the inability of a malware detection system to detect malware where the malware includes functionality that detects it is being observed or tested and, as a result, masks its malicious operations. One of the technical solutions to the technical problem includes modifying executable code that possibly contains malware by modifying branch instructions in order to force execution of portions of the executable code that may otherwise not execute. As a consequence, the systems and methods of the present disclosure detect malware that otherwise would not have been detected, and the threat of malware that is incorrectly labeled as "safe" is reduced or eliminated.

FIG. 1 illustrates an example system 100 for detecting malware by modifying executable code, in accordance with some implementations of the present disclosure. The system 100 may include a malware detection system 110. In one implementation, the malware detection system 110 includes a malware detection manager 112. The malware detection system 110 may include a testing environment subsystem 114. The testing environment subsystem 114, in some implementations, includes one or more testing environments 116A-N. As discussed further below, in one or more implementations, the malware detection system 110 obtains executable code 118, which may include malware. The malware detection system 110 can perform one or more operations, using the malware detection manager 112 and the testing environment subsystem 114, to modify the executable code 118 and test the different versions of the modified executable code 118 to detect malware in the executable code 118. The modified executable code 118 may be referred to executable code with modified branch instructions 120A-N. In some implementations, the system 100 includes an email system 130, a cloud-based content management platform 140, or a computing device 150 with a web browser 152. The malware detection system 110, the email system 130, the cloud-based content management platform 140, and/or the computing device 150 may be in data communication over a computer network 160.

In one implementation, the malware detection system 110 includes one or more computing devices. A computing device may include a physical computing device or may include a virtualized component, such as a virtual machine (VM) or a container. A computing device may include an instance of a computing device. An instance of a computing device may include a spun-up instance that may not be specific to any computing device. In some implementations, a VM includes a system virtual machine, which may include a VM that emulates an entire physical computing device. A VM may include a process virtual machine, which may include a VM that emulates an application or some other software. A container may include a computing environment that logically surrounds one or more software applications independently of other applications executing in a computing environment.

In some implementations, the malware detection manager 112 includes a hardware component, a software component, or a combination of hardware and software components. The malware detection manager 112 can be configured to obtain the executable code 118, generate one or more modified versions of the executable code 118 (e.g., the executable code with modified branch instructions 120A-N), cause execution of the executable code with modified branch instructions 120A-N in the one or more testing environments 116A-N, and detect, based on the execution(s) of the executable code with modified branch instructions 120A-N, that the executable code 118 is malicious. Further details regarding the functionality of the malware detection manager 112 are discussed further below in relation to FIG. 2 and FIG. 6.

The testing environment subsystem 114, in some implementations, includes the one or more testing environments 116A-N. A testing environment 116A-N may include an isolated computing environment configured to prevent the spread of malware. In some implementations, a testing environment 116A-N includes a sandbox. A testing environment 116A-N may include a VM. A testing environment 116A-N may include a container. A testing environment 116A-N may include a physical computing device. A testing environment 116A-N may include limited network functionality, e.g., the testing environment 116A-N may include a computing device not connected to a network or may include multiple computing devices connected only to each other and not connected to any computing devices outside of the testing environment 116A-N. In some implementations, the testing environment subsystem 114 includes a testing environment manager (not shown in FIG. 1), which may include software or hardware configured to start or stop the operation of a testing environment 116A-N, monitor the operation of a testing environment 116A-N, or the like.

In some implementations, the executable code 118 includes one or more computer-executable instructions. Computer-executable instructions may include assembly code, machine code, or other similar instructions. The computer-executable instructions may include instructions written in an interpreted programming or scripting language (e.g., a language that uses an interpreter). The executable code 118 may be included in a file. The file may include an executable file. The file may include a data file that includes executable instructions, e.g., a Portable Document Format (PDF) file that includes executable instructions or a word processing document that includes an executable script. The executable code 118 may include a data stream. The executable code 118 may be in some other format.

In one or more implementations, the executable code with modified branch instructions 120A-N includes the executable code 118 as modified by the malware detection manager 112. The malware detection manager 112 modifying the executable code 118 may include the malware detection manager 112 modifying one or more instructions in the executable code 118 itself to change the executable code 118 into the executable code with modified branch instructions 120A-N. The malware detection manager 112 modifying the executable code 118 may include the malware detection manager 112 making a copy of the executable code 118 and then modifying one or more instructions of the copy to create the executable code with modified branch instructions 120A-N.

The email system 130 may include an email server, a cloud email system, an email service, or some other email system. The email system 130 can store one or more email messages. An email message may include one or more attachments. An email attachment may include a file, which may include the executable code 118.

The cloud-based content management platform 140 may include a cloud platform that provides collaborative tools such as document applications (e.g., word processor, presentation, and spreadsheet applications); a cloud-based document storage service that can store document application documents, image files, video files, audio files, or other file formats; an online calendar; an email service (e.g., the email system 130); a messenger, etc. The cloud-based content management platform 140 can allow users of the platform 140 to collaborate on a document stored on the platform 140. Such collaboration may include, for example, reviewing, sharing, editing, or commenting on a document. The cloud-based content management platform 140, in some implementations, stores the executable code 118 (e.g., in the cloud-based document storage of the platform 140).

In one implementation, the computing device 150 includes a computing device associated with a user of the malware detection system 110, the email system 130, or the cloud-based content management platform 140. The computing device 150 can execute a web browser 152, which the user of the computing device 150 may use to access a webpage, access the email system 130 or the cloud-based content management platform 140, or other computing resources over the computer network 160. The web browser 152 can download a file from a webpage, and the file may include the executable code 118.

In implementations of the disclosure, a "user" can be represented as a single individual. However, other implementations of the disclosure encompass a "user" being an entity controlled by a set of users or an organization and/or an automated source such as a system or a platform. In situations in which the systems discussed here collect personal information about users, or can make use of personal information, the users can be provided with an opportunity to control whether the malware detection system 110, the email system 130, the cloud-based content management platform 140, or the web browser 152 collects user information (e.g., information about a user's social network, social actions or activities, profession, a user's preferences, or a user's current location), or to control whether and/or how to receive content from the malware detection system 110, the email system 130, the cloud-based content management platform 140, or the web browser 152 that can be more relevant to the user. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over how information is collected about the user and used by the malware detection system 110, the email system 130, the cloud-based content management platform 140, or the web browser 152.

Figure 2:
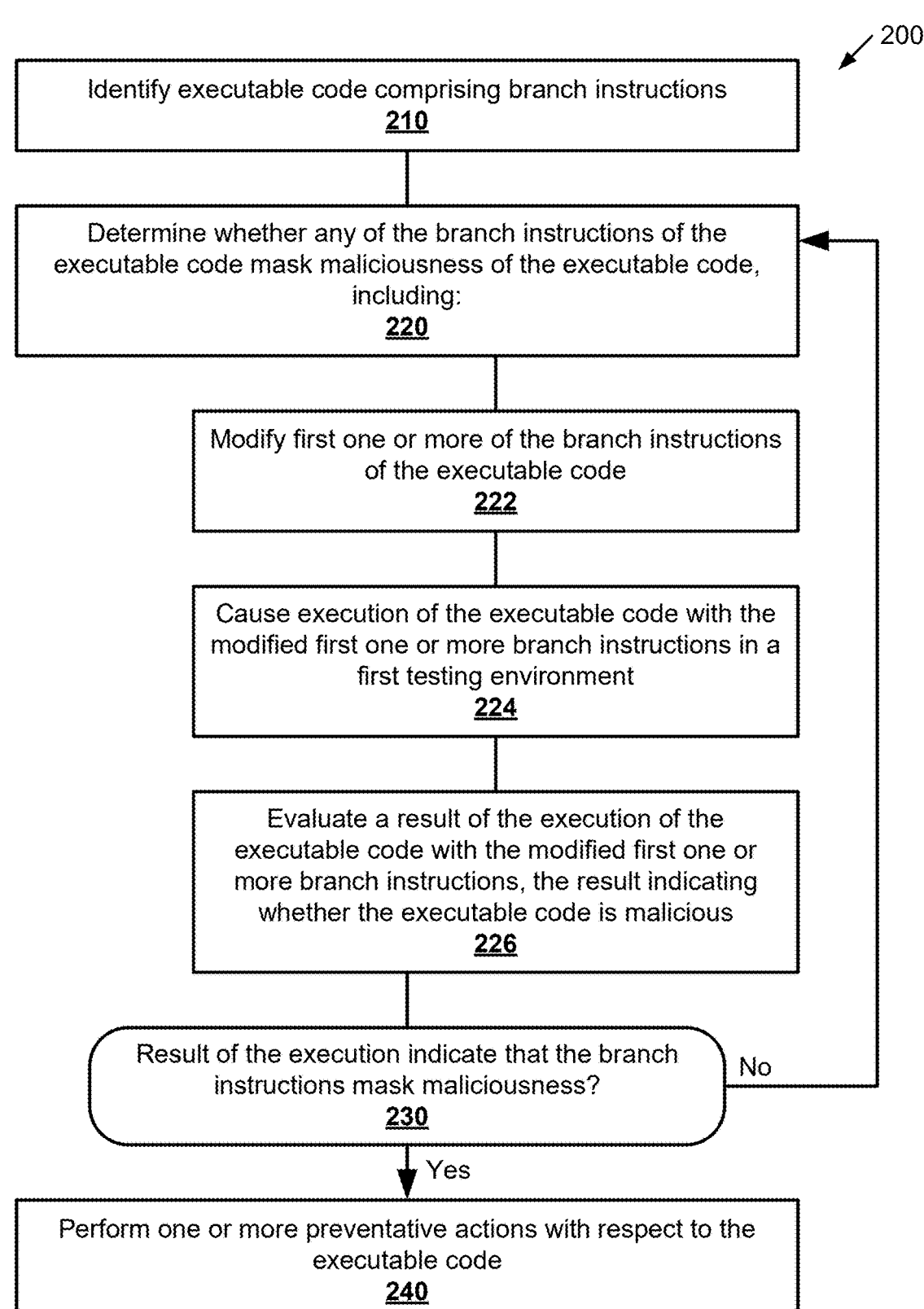
FIG. 2 is a flowchart illustrating an example method for detecting malware by modifying executable code, in accordance with some implementations of the present disclosure.

FIG. 2 is a flowchart illustrating one embodiment of a method 200 for detecting malware by modifying executable code, in accordance with some implementations of the present disclosure. A processing device, having one or more central processing units (CPU(s)), one or more graphics processing units (GPU(s)), and/or memory devices communicatively coupled to the one or more CPU(s) and/or GPU(s) can perform the method 200 and/or one or more of the method's 200 individual functions, routines, subroutines, or operations. In certain implementations, a single processing thread can perform the method 200. Alternatively, two or more processing threads can perform the method 200, each thread executing one or more individual functions, routines, subroutines, or operations of the method. In an illustrative example, the processing threads implementing the method 200 can be synchronized (e.g., using semaphores, critical sections, and/or other thread synchronization mechanisms). Alternatively, the processing threads implementing the method 200 can be executed asynchronously with respect to each other. Various operations of the method 200 can be performed in a different (e.g., reversed) order compared with the order shown in FIG. 2. Some operations of the method 200 can be performed concurrently with other operations. Some operations can be optional. In one or more implementations, the malware detection manager 112 performs one or more of the operations of the method 200.

At block 210, processing logic identifies executable code. The executable code may include one or more branch instructions. In one implementation, the executable code includes the executable code 118 of FIG. 1. The executable code 118 may include executable code as originally obtained by the malware detection system 110.

The executable code 118 may include a portion of an email attachment. For example, responsive to the email system 130 receiving an email with an attachment, the email system 130 can provide the attachment to the malware detection system 110. The malware detection system 110 can obtain the executable code 118 from the attachment and, as described herein, perform one or more operations on the executable code 118 to determine whether the executable code 118 includes malware.

The executable code 118 may include a portion of a file stored in the cloud-based content management platform 140. For example, as discussed above, the cloud-based content management platform 140 may include a cloud-based document storage service that can store computer files of various formats. Responsive to a user of the cloud-based content management platform 140 attempting to upload a file to the platform 140, the platform 140 can store the file in a quarantined or isolated location on the platform 140 until a malware analysis can be performed on the file. The platform 140 can provide the file to the malware detection system 110. The malware detection system 110 can obtain the executable code 118 from the file and, as described herein, perform one or more operations on the executable code 118 to determine whether the executable code 118 includes malware.

The executable code 118 may include a portion of a file downloaded using the web browser 152. For example, responsive to a user of the computing device 150 attempting to download a file from a webpage using the web browser 152, the web browser 152 can store the file in a quarantined or isolated location of the computing device 150 until a malware analysis can be performed on the file. The web browser 152 can provide the file to the malware detection system 110. The malware detection system 110 can obtain the executable code 118 from the file and, as described herein, perform one or more operations on the executable code 118 to determine whether the executable code 118 includes malware.

In some implementations, the executable code 118 includes one or more instructions. An instruction may include data that can be executed by a processing device (e.g., machine code, assembly code, etc.) or data that can be interpreted into data that can be executed by a processing device (e.g., programming code written in an interpreted programming language). An instruction may carry out one or more operations of the executable code 118.

In one implementation, the one or more branch instructions of the executable code 118 include a jump instruction. A jump instruction may include a computer-executable instruction that causes a processing device executing the executable code 118 to begin executing a different section of the executable code 118. For example, a jump instruction may include a jump-if-equal (JE) instruction, a jump-if-not-equal (JNE), jump-if-zero (JZ), jump-if-not-zero (JNZ), jump-if-overflow (JO), jump-if-not-overflow (JNO), or other jump instructions in the x86 instruction set architecture. A jump instruction may include a conditional statement of a programming language (e.g., an if statement, an if-else statement, a case or switch statement, etc.).

In some implementations, the one or more branch instructions of the executable code 118 include a call instruction. A call instruction may include a computer-executable instruction that causes a processing device executing the executable code 118 to begin executing a subroutine or function in the executable code 118. For example, a call instruction may include a call (CALL) instruction in the x86 instruction set architecture. A call instruction may include a method or function call of a programming language.

In some implementations, the one or more branch instructions of the executable code 118 include a return instruction. A return instruction may include a computer-executable instruction that causes a processing device executing the executable code 118 to exit a subroutine or function of the executable code 118 that is currently executing. For example, a return instruction may include a return (RET) instruction in the x86 instruction set architecture. A return instruction may include a return statement of a programming language that causes the execution to exit the current function or method.

At block 220, processing logic determines whether any of the branch instructions of the executable code 118 mask the maliciousness of the executable code 118. The determining operation of block 220 may include, at block 222, processing logic modifying first one or more branch instructions of the executable code 118. In one implementation, modifying the first one or more branch instructions of the executable code 118 includes randomly selecting the first one or more branch instructions from the branch instructions of the executable code 118. For example, the malware detection manager 112 can analyze the executable code 118 to identify branch instructions contained in the executable code 118 and can randomly select a portion of the identified branch instructions to be the first one or more branch instructions.

In one implementation, the first one or more branch instructions includes a jump instruction, and modifying the first one or more branch instructions includes replacing the jump instruction with a complementary version of the jump instruction. The complementary version of the jump instruction may include a jump instruction that performs an opposite function as the original jump instruction. For example, the complementary version of a jump-if-equal instruction may include a jump-if-not-equal instruction, and vice versa.

The complementary version of a jump-if-overflow may include a jump-if-not-overflow instruction, and vice versa. The complementary version of a jump-if-zero instruction may include a jump-if-not-zero instruction, and vice versa. Thus, in one implementation, where the jump instruction includes a jump-if-equal instruction, modifying the first one or more branch instructions includes changing the jump-if-equal instruction to a jump-if-not-equal instruction. Similarly, where the jump instruction includes a jump-if-overflow instruction, modifying the first one or more branch instructions may include changing the jump-if-overflow instruction to a jump-if-not-overflow instruction.

In some implementations, where the branch instruction includes a conditional statement with a comparison operator, replacing the branch instruction with a complementary version of the branch instruction includes changing the comparison operator to reverse the direction of the inequality. For example, where the conditional statement includes a greater-than operator, replacing the greater-than operator with a complementary version includes replacing the greater-than operator with a less-than-or-equal-to operator, and vice versa. Where the conditional statement includes a less-than operator, replacing the less-than operator with a complementary version includes replacing the less-than operator with a greater-than-or-equal-to operator, and vice versa.

In some implementations, where a branch instruction includes an if statement or an if-else, modifying the if statement may include negating the conditional associated with the if statement. For example, where the if statement includes the conditional "if(A equals 'true')", negating the conditional may include changing the conditional to "if(A does not equal 'true')".

In some implementations, modifying a branch instruction may include replacing the branch instruction with no operation (no-op, NOP, or NOOP) instruction, which may include a null statement, null operator, null function, or the like. Replacing the branch instruction with a no operation instruction may cause a processing device that executes the executable code with the modified first one or more branch instructions 120A to proceed to the next instruction instead of evaluating the branch instruction and possibly branching to another section of the executable code with the modified first one or more branch instructions 120A. The branch instruction May include a call instruction, a return instruction, a conditional statement, or some other type of branch instruction.

At block 224, processing logic causes execution of the executable code with the modified first one or more branch instructions 120A in a first testing environment. In one implementation, the malware detection manager 112 issues a command to the testing environment subsystem 114 to provide a first testing environment 116A. The malware detection manager 112 can provide the executable code with the modified first one or more branch instructions 120A to the first testing environment 116A. The malware detection manager 112 can issue a command to the first testing environment 116A to execute the executable code with the modified first one or more branch instructions 120A. For example, where the executable code with the modified first one or more branch instructions 120A includes an executable file, executing the executable code with the modified first one or more branch instructions 120A in the first testing environment 116A includes loading the file into a memory of the first testing environment 116A and having a processor device of the first testing environment 116A execute the file. In another example, where the executable code with the modified first one or more branch instructions 120A is included in a file (e.g., a PDF), executing the executable code with the modified first one or more branch instructions 120A in the first testing environment 116A may include the first testing environment 116A using a software application to open the file, performing one or more operations on the open file, or the like. Because the executable code with the modified first one or more branch instructions 120A is a modified version of the executable code 118, e.g., due to the malware detection manager 112 modifying one or more branch operations contained in the executable code 118, execution of the executable code with the modified first one or more branch instructions 120A may reveal different functionality than had the first testing environment 116A executed the executable code 118.

At block 226, processing logic evaluates a result of the execution of the executable code with the modified first one or more branch instructions 120A. The result can indicate whether the executable code 118 is malicious. Evaluating the result of the execution of the executable code with the modified first one or more branch instructions 120A may include observing the execution of the executable code with the modified first one or more branch instructions 120A in the first testing environment 116A and detecting one or more malicious operations.

In one implementation, a malicious operation involves the executable code with the modified first one or more branch instructions 120A attempting to replicate itself by modifying another software application of the first testing environment 116A and inserting the executable code with the modified first one or more branch instructions' 120A code into the other software application. A malicious operation may involve the executable code with the modified first one or more branch instructions 120A attempting to access predetermined data of the first testing environment 116A. The predetermined data may include files or other data that non-malware software does not usually access. The predetermined data may include a password file, one or more operating system (OS) files, a block of memory allocated to another process executing in the first testing environment 116A, the OS, or some other data. A malicious operation may involve the executable code with the modified first one or more branch instructions 120A attempting to delete files or other data that are associated with the OS or other software applications.

A malicious operation may include attempting to obtain elevated privileges on the OS of the first testing environment 116A. A malicious operation may include attempting to disable or modify a software application of the first testing environment 116A (e.g., anti-virus software or other computer security software). A malicious operation may include attempting to transmit data over a network to another computing device. For example, the executable code with the modified first one or more branch instructions 120A may attempt to replicate itself on another computing device accessible via a network. In another example, the executable code with the modified first one or more branch instructions 120A may attempt to perform a network scan. In another example, the executable code with the modified first one or more branch instructions 120A may attempt to transmit data to a remote computing device (e.g., to open a backdoor to the first testing environment 116A, to alert a DDoS host that the executable code with the modified first one or more branch instructions 120A is ready for assisting in DDoS attacks, etc.).

A malicious operation may include attempting to encrypt one or more files or other data of the first testing environment 116A, which may be part of a ransomware attack. A malicious operation may include attempting to access data about a user's use of the first testing environment 116A (e.g., a browsing history associated with a web browser, a registry of software applications installed on the first testing environment 116A, or the like). A malicious operation may include attempting to install a keylogger, a cryptominer (software that validates blockchain transactions or performs other blockchain operations in order to obtain cryptocurrency as a reward), spyware, adware, or other unwanted software on the first testing environment 116A.

At block 230, processing logic determines whether the result of block 226 indicates that the branch instructions mask the maliciousness of the executable code 118. This may include detecting one or more malicious operations based on the result of block 226. Responsive to determining that the branch instructions of the executable code 118 mask the maliciousness of the executable code 118, processing logic, at block 240, performs one or more preventative actions with respect to the executable code 118.

In one implementation, a preventative action includes providing an alert to a user that the executable code contains malware. For example, where the executable code 118 is included in an email attachment received by the email system 130, the malware detection system 110 can send a notification to the email system 130, which can notify the recipient of the email containing the attachment that the attachment contains malware. In another example, where the executable code 118 is included in a file that a user attempts to upload to the cloud-based content management platform 140, the malware detection system 110 can send a notification to the platform 140, which can notify the user that the file contains malware. In another example, where the executable code is included in a file that a user attempts to download using a software application (e.g., the web browser 152), the malware detection system 110 can send a notification to the software application, which can notify the user that the file contains malware.

In one or more implementations, a preventative action includes preventing a user from executing or otherwise accessing the executable code 118. For example, where the executable code 118 is included in an email attachment received by the email system 130, preventing the user from executing or accessing the executable code 118 may include the malware detection system 110 sending a notification to the email system 130, and the email system 130 can prevent the recipient of the email attachment from opening or downloading the attachment. In another example, where the executable code 118 is included in a file that a user attempts to upload to the cloud-based content management platform 140, the malware detection system 110 can send a notification to the platform 140, and the platform 140 can prevent the user from performing certain actions on the platform 140 associated with the file (e.g., sharing the file with other users of the platform 140, opening the file, modifying the file, etc.). In another example, where the executable code is included in a file that a user attempts to download using a software application (e.g., the web browser 152), the malware detection system 110 can prevent the user from downloading the file.

In one or more implementations, a preventative action includes deleting the executable code 118. For example, the malware detection system 110 can cause the email system 130 to delete an email attachment that includes the executable code 118. In another example, the malware detection system 110 can cause the cloud-based content management platform 140 to delete a file that includes the executable code 118. In another example, the malware detection system 110 can cause a software application (e.g., the web browser 152) to delete the file that includes the executable code 118 from the computing device 150.

In some implementations, the malware detection manager 112 can create multiple modified versions of the executable code 118 in order to test different portions of the executable code 118 for malicious operations. For example, in one implementation, block 220 further includes modifying second one or more branch instructions of the one or more branch instructions of the executable code 118 to create the executable code with the second one or more branch instructions 120B of FIG. 1. In some implementations, the first one or more branch instructions and the second one or more branch instructions may include different branch instructions. The first one or more branch instructions and the second one or more branch instructions may partially overlap. Modifying second one or more branch instructions of the one or more branch instructions of the executable code 118 may include functionality similar to the functionality of block 222.

Block 220 may further include causing execution of the executable code with the modified second one or more branch instructions 120B in a second testing environment 116B. Causing the execution of the executable code with the modified second one or more branch instructions 120B in a second testing environment 116B may include similar functionality to the functionality of block 224. By executing the executable code with the modified first one or more branch instructions 120A and the executable code with the modified second one or more branch instructions 120B in the first testing environment 116A and second testing environment 116B, respectively, each with their respective set of modified branch instructions, different parts of the executable code 118 may be executed, which may increase the code coverage of the executable code 118 and reveal additional functionality of the executable code 118 that may not have executed had only the original executable code 118 been executed in a testing environment 116A-N. The code coverage of the executable code 118 may include a metric indicating the proportion of the executable instructions of the executable code 118 that are executed during the execution of the executable code with modified branch instructions 120A-N in the different testing environments 116A-N.

The block 220 may further include evaluating a second result of the execution of the executable code with the modified second one or more branch instructions 120B. The second result can indicate whether the executable code 118 is malicious. Evaluating a second result of the execution of the executable code with the modified second one or more branch instructions 120B may include functionality similar to the functionality of block 226.

In some implementations, the process of generating the executable code with the modified second one or more branch instructions 120B, causing the execution of the executable code with the modified second one or more branch instructions 120B in the second testing environments 116B, and evaluating the second result of the execution of the executable code with the modified second one or more branch instructions 120B, as discussed above, can be repeated to generate and execute additional executable code with modified branch instructions 120C-N. For example, as seen in FIG. 1, the malware detection manager 112 can generate multiple copies of the executable code with modified one or more branch instructions 120A-N, each copy with its own set of branch instructions that have been modified to be different from the original executable code 118. Each copy of the executable code with modified one or more branch instructions 120A-N can execute in its own testing environment 116A-N and be observed to detect malicious operations. If any of the copies of the executable code with modified one or more branch instructions 120A-N exhibit malicious operations, then the original executable code 118 may be determined to contain malware. By using multiple copies of the executable code with modified one or more branch instructions 120A-N, each with different modified branch instructions, the amount of functionality of the executable code 118 is increased, which may increase the likelihood of observing malicious operations performed by the executable code 118.

Responsive to the result of block 226 not indicating that the branch instructions of the executable code 118 mask a maliciousness of the executable code 118, the malware detection manager 112 can determine that the executable code 118 does not contain malware. Responsive to determining that the executable code 118 does not contain malware, the malware detection system can perform one or more actions. For example, the malware detection system 110 can send a notification to the email system 130, which can allow the recipient of an email attachment that includes the executable code 118 to access the attachment. The malware detection system 110 can send a notification to the cloud-based content management platform 140, and the platform 140 can allow a user to upload a file that includes the executable code 118 to the platform's 140 cloud-based document storage service or perform other operations on the platform 140 regarding the file. The malware detection system 110 can send a notification to a software application (e.g., the web browser 152), and the software application can allow the user to access a downloaded file that includes the executable code 118.

In some implementations, processing logic identifies a malware monitoring detection subroutine of the executable code 118. The malware monitoring detection subroutine may include a section of code of the executable code 118 that is configured to detect whether the executable code 118 is being monitored or tested for malware. The malware monitoring detection subroutine may be associated with a branch instruction of the first one or more branch instructions. The malware detection manager 112 can identify the malware monitoring detection subroutine by modifying the first one or more branch instructions, as discussed above, and then detecting one or more malicious operations during execution of the executable code with the modified first one or more branch instructions 120A. The malware detection manager 112 can analyze instructions associated with the first one or more branch instructions to identify a section of code that is likely a malware monitoring detection subroutine. Processing logic can modify a return instruction of the malware monitoring detection subroutine. Modifying the return instruction may include changing the return instruction to always return a value that indicates that the executable code with the modified first one or more branch instructions 120A is not being monitored for malware (e.g., a "false" Boolean value, a "0" value, etc.). Processing logic can cause the execution of the executable code with the modified return instruction to be provided to a second testing environment 116B. Processing logic can cause the executable code with the modified return instruction to be executed in the second testing environment 116B to confirm that the malicious operations are still performed and to confirm that the malware monitoring detection subroutine was correctly identified.

As discussed above, in some implementations, the malware detection manager 112 randomly selects a portion of the one or more branch instructions of the executable code 118 as the first one or more branch instructions. The malware detection manager 112 can determine the number of branch instructions in the first one or more branch instructions. The number of branch instructions in the first one or more branch instructions may include a predetermined portion of the one or more branch instructions of the executable code 118. The number of branch instructions in the first one or more branch instructions may include a predetermined number. The number of branch instructions may include a randomly selected number.

In some implementations the malware detection manager 112 can select one or more branch instructions of the executable code 118 as the first one or more branch instructions based on one or more selection criteria. In some implementations, the one or more selection criteria include selecting branch instructions whose modification will increase the code coverage of the executable code 118.

In some implementations, the malware detection manager 112 can calculate a code coverage of the executable code 118 and determine, based on the code coverage (and other factors), whether the executable code 118 does not contain malware. At block 230, processing logic further calculates, based on the execution of the executable code with modified branch instructions 120A-N, a code coverage of the executable code 118. As discussed above, the code coverage of the executable code 118 may include a metric indicating the proportion of the executable instructions that are executed during the execution of the one or more executable code with modified branch instructions 120A-N in the one or more testing environments 116A-N.

At block 240, processing logic further determines whether the code coverage exceeds a threshold amount. Responsive to the code coverage exceeding the threshold amount and responsive to the results of block 226 not indicating that the executable code 118 is malicious, the processing logic can further determine that the executable code 118 is not malicious. In one implementation, responsive to determining that the code coverage does not exceed the threshold amount, the method 200 can repeat from block 220 in order to increase the code coverage. In some implementations, configuration data of the malware detection system 110 or the malware detection manager 112 may include the threshold amount. A user of the malware detection system 110 or the malware detection manager 112 may provide or modify the threshold amount.

In some implementations, the malware detection manager 112 causes execution of the original executable code 118, without any modifications, to determine whether the executable code 118 is malicious. The executable code 118, in some cases, may not mask its maliciousness, or may do a poor job of masking its maliciousness. Processing logic may cause execution of the executable code 118, without any modifications, in a testing environment 116, which may include functionality similar to block 224. Processing logic may evaluate a result of the execution of the executable code 118, the result indicating whether the executable code 118 is malicious, which may include functionality similar to block 226. Responsive to the result indicating that the executable code 118 is malicious, processing logic may perform one or more preventative actions with respect to the executable code 118, which may include functionality similar to block 240. In one implementation, processing logic may cause the execution of the unmodified executable code 118 in the testing environment prior to modifying one or more branch instructions of the executable code 118 or causing execution of the executable code with modified branch instructions 120.

In one implementation, the malware detection manager 112 may calculate a code coverage of the executable code with the modified first one or more branch instructions 120A. If the code coverage of the executable code with the modified first one or more branch instructions 120A exceeds the code coverage of the original executable code 118, the malware detection manager 112 may use the executable code with the modified first one or more branch instructions 120A as the base from which further executable code with the modified one or more branch instructions 120B are generated. The malware detection manager 112 may repeat this process, further modifying the executable code with the modified first one or more branch instructions 120A and determining whether the code coverage of the further modified executable code 120B exceeds the previous modified executable code 120A to determine whether to use the further modified executable code 120B as the base.

The method 200 further includes causing execution of the executable code 118 in the first testing environment 116A. The method 200 may include calculating a first code coverage of the executable code 118. Causing execution of the executable code 118 and calculating the first code coverage of the executable code 118 may occur as part of block 210, prior to block 220, or at some other time during the performance of the method 200.

The method 200 may further include calculating a second code coverage of the executable code with the modified first one or more branch instructions 120A. Calculating the second code coverage may occur as part of block 224 or block 226. In one implementation, responsive to the second code coverage exceeding the first code coverage, the method 200 includes modifying second one or more branch instructions of the executable code with the modified first one or more branch instructions 120A. In some implementations, the second one or more branch instructions may not include any of the first one or more branch instructions. Responsive to the second code coverage not exceeding the first code coverage, the method 200 may continue to block 230.

The method 200 may further include causing execution of the executable code with the modified first one or more branch instructions and the modified second one or more branch instructions 120B in the first testing environment 120A, which may include functionality similar to the functionality of block 224. The method 200 may further include evaluating a result of the execution of the executable code with the modified first one or more branch instructions and the modified second one or more branch instructions 120B, the result indicating whether the executable code 118 is malicious, which may include functionality similar to the functionality of block 226. The above process of selecting the executable code with the modified one or more branch instructions 120 with the higher code coverage to use as the base for further modifying the executable code with the modified one or more branch instructions 120 may repeat for one or more further iterations.

Figure 3:
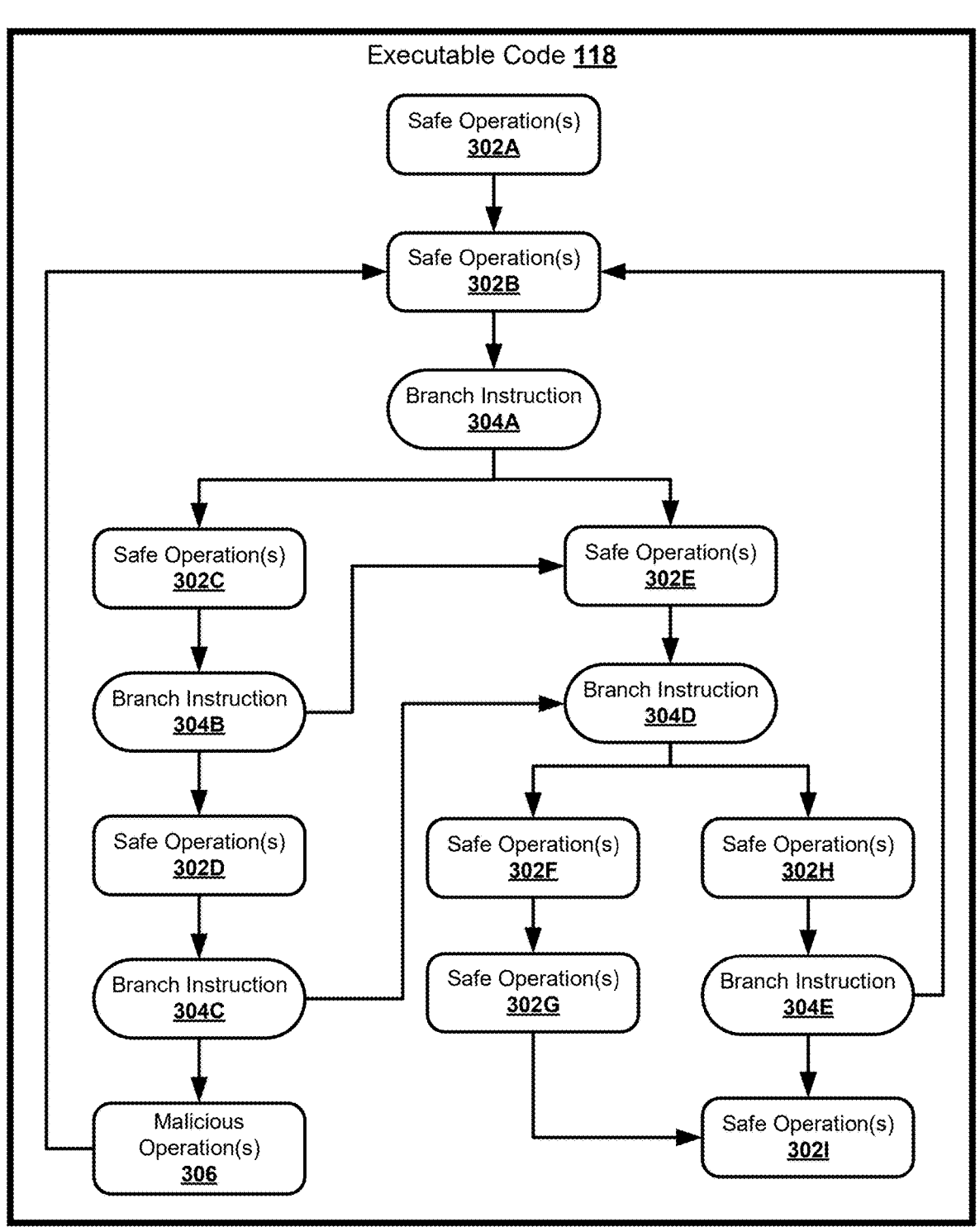
FIG. 3 is a schematic block diagram illustrating an example execution flow of executable code, in accordance with some implementations of the present disclosure.

FIG. 3 depicts an example execution flow of the executable code 118, in accordance with some implementations of the present disclosure. The execution of the executable code 118 may include performing one or more safe operations 302A. A safe operation may include an operation of the executable code 118 that does not indicate that the executable code 118 contains malware. Execution of the executable code 118 may continue and perform one or more safe operations 302B. The execution of the executable code 118 may continue to the branch instruction 304A. Responsive to a condition associated with the branch instruction 304A being satisfied, the execution of the executable code 118 may continue to the one or more safe operations 302C. Responsive to the condition associated with the branch instruction 304A not being satisfied, the execution of the executable code 118 may continue to the one or more safe operations 302E. Execution of the executable code 118 may continue through the one or more sections of safe operations 302E-I and branch instructions 304B-E as shown in FIG. 3.

As shown in FIG. 3, at the branch instruction 304C, the processing device executing the executable code 118 may determine whether a condition associated with the branch instruction 304C is satisfied. If so, the execution may continue to the branch instruction 304D. If not, the execution may continue to the malicious operation 306. As an example, the branch instruction 304C may be associated with a condition that indicates whether the executable code 118 is being observed for malware. Responsive to the condition being satisfied (e.g., a portion of the executable code 118 detecting that the executable code 118 is being observed for malware), the execution continues to the branch instruction 304D and, thus, in order to avoid detection, does not including performing the one or more malicious operations 306.

Figure 4:
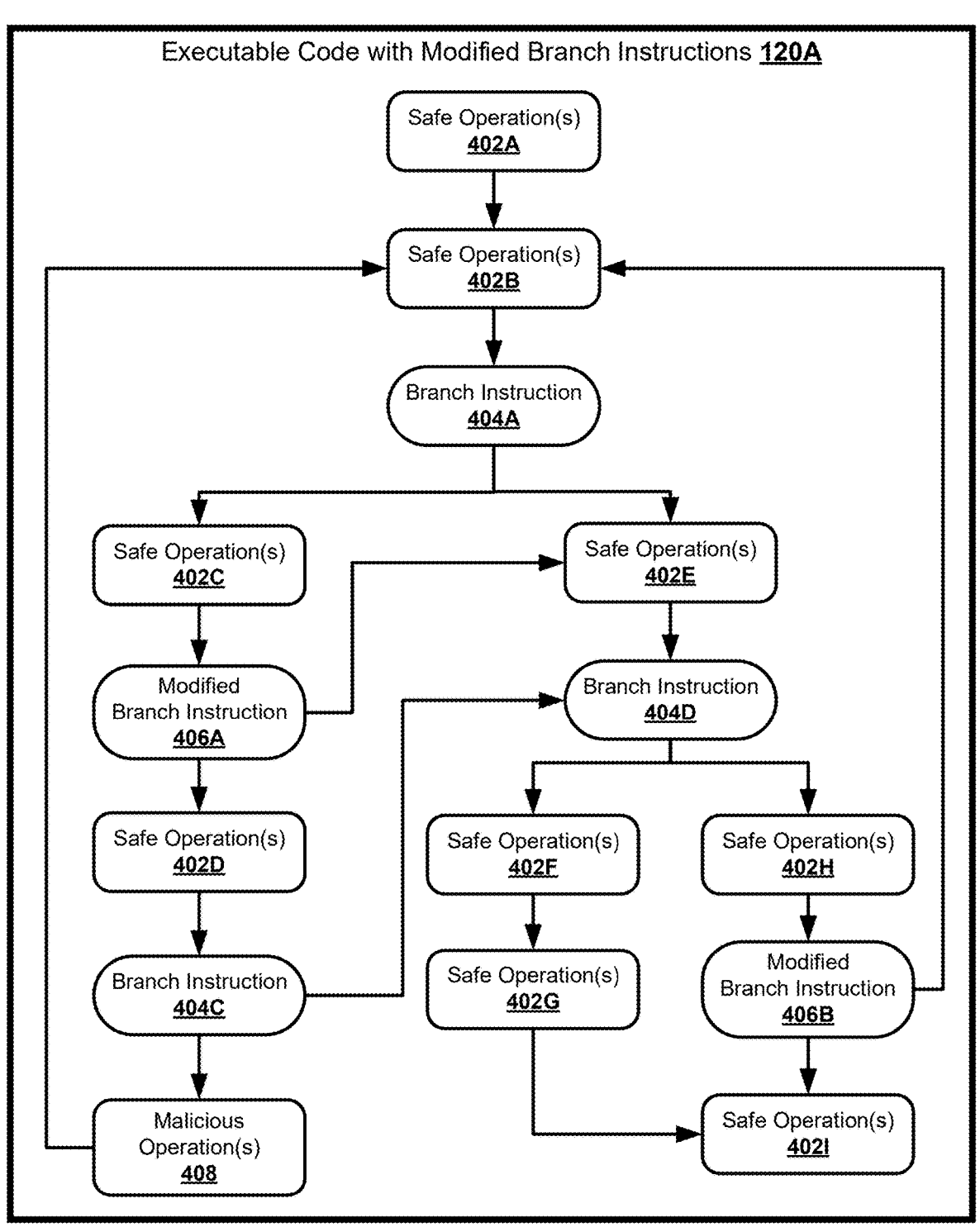
FIG. 4 is a schematic block diagram illustrating an example execution flow of modified executable code, in accordance with some implementations of the present disclosure.

FIG. 4 depicts an example execution flow of the executable code with modified first one or more branch instructions 120A, in accordance with some implementations of the present disclosure. The executable code with modified first one or more branch instructions 120A may include a copy of the original executable code 118 but may have been modified during block 222 of the method 200. For example, as can be seen in FIG. 4, safe operation(s) 402A-I may include copies of the safe operation(s) 302A-I, respectively, of FIG. 3, the branch instructions 404A, 404C, and 404D may include copies of the branch instructions 304A, 304C, and 304D, respectively, of FIG. 3, and the malicious operation(s) 408 include copies of the malicious operation(s) 306 of FIG. 3. As can also be seen in FIG. 4, the branch instruction 304B and the branch instruction 304E of FIG. 3 have been changed to modified branch instruction 406A and modified branch instruction 406B, respectively. Thus, the branch instructions 406B and 406E may form the modified first one or more branch instructions discussed in block 222. The executable code with modified first one or more branch instructions 120A may be executed in the first testing environment 116A. However, the executable code with modified first one or more branch instructions 120A may not perform the one or more malicious operations 306 because the branch instruction 404C leading to the one or more malicious operations 408 was not modified.

Figure 5:
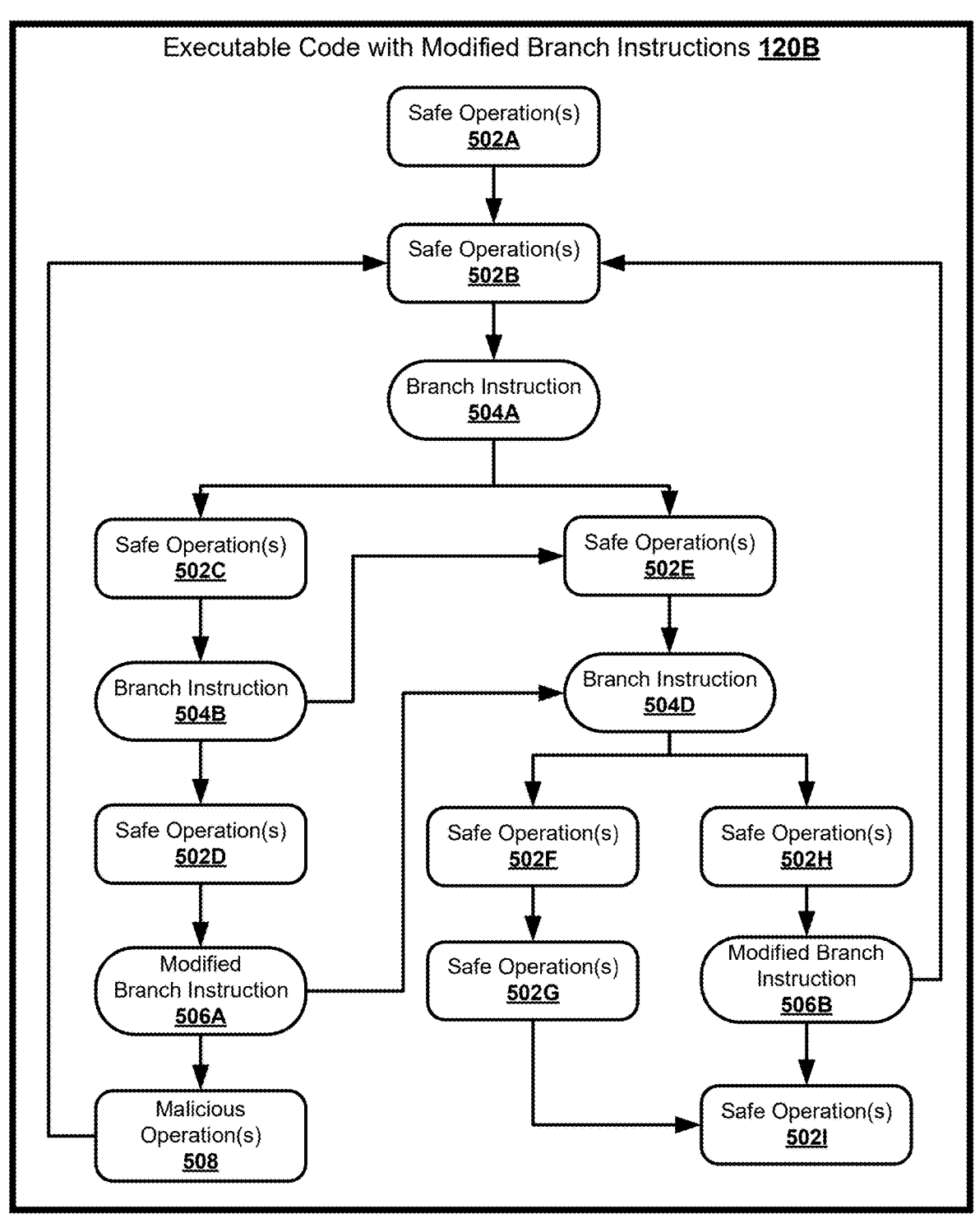
FIG. 5 is a schematic block diagram illustrating another example execution flow of modified executable code, in accordance with some implementations of the present disclosure.

FIG. 5 depicts another example execution flow of the executable code with modified second one or more branch instructions 120B, in accordance with some implementations of the present disclosure. The executable code with modified second one or more branch instructions 120B may include a copy of the original executable code 118, but some of the branch instructions 304 may have been modified during block 222 of the method 200. For example, as can be seen in FIG. 5, safe operation(s) 502A-I may include copies of the safe operation(s) 302A-I, respectively, of FIG. 3, the branch instructions 504A, 504B, and 504D may include copies of the branch instructions 304A, 304B, and 304D, respectively, of FIG. 3, and the malicious operation(s) 508 includes copies of the malicious operation(s) 306 of FIG. 3. As can also be seen in FIG. 5, the branch instruction 304B and the branch instruction 304E have been changed to modified branch instruction 506A and modified branch instruction 506B, respectively. Thus, the branch instructions 506A and 506B may form the modified second one or more branch instructions, discussed above. The executable code with modified second one or more branch instructions 120B may be executed in the second testing environment 116B. In this implementation, the executable code with modified second one or more branch instructions 120B performs the one or more malicious operations 508 because the branch instruction 304C leading to the one or more malicious operations 508 was modified to become the modified branch instruction 506A.

For example, the branch instruction 304C may be a jump-if-zero instruction that jumps to a section beginning with the branch instruction 304D. The condition associated with the jump-if-zero instruction may evaluate to zero responsive to the executable code 118 determining that the executable code 118 is being observed for malware. The condition associated with the jump-if-zero instruction may evaluate to a value other than zero responsive to the executable code 118 determining that the executable code 118 is not being observed for malware. The malware detection manager 112 may generate the executable code with modified second one or more branch instructions 120B and may modify the jump-if-zero instruction 304C to a jump-if-not-zero instruction 506A. Thus, the condition associated with the jump-if-not zero instruction may still evaluate to zero responsive to the executable code with modified second one or more branch instructions 120B determining that it is being observed for malware. However, because of the modified branch instruction 506A that is now a jump-if-not-equals instruction, the execution will not jump to the section beginning with the branch instruction 504D and will, instead, continue to the one or more malicious operations 508.

Figure 7:
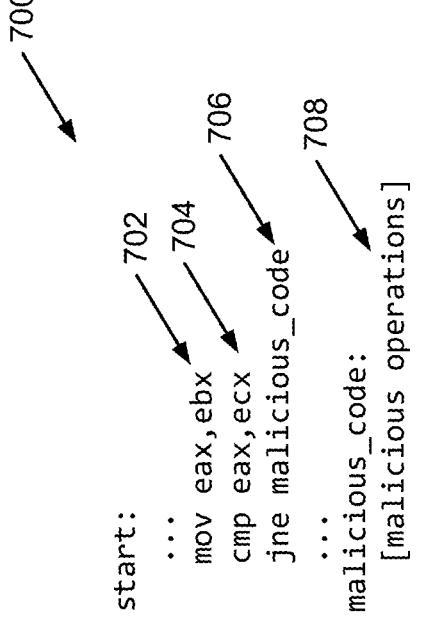
FIG. 7 illustrates an example section of executable instructions of modified executable code, in accordance with some implementations of the present disclosure.
Figure 6:
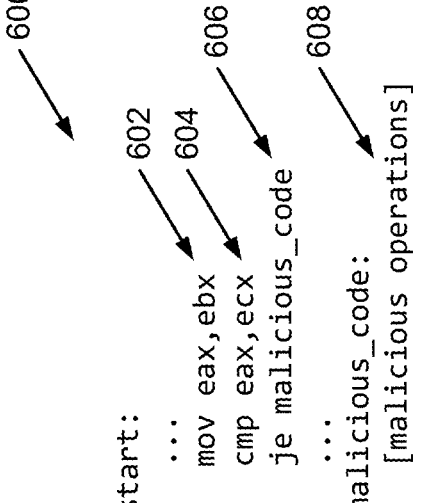
FIG. 6 illustrates an example section of executable instructions of executable code, in accordance with some implementations of the present disclosure.

FIG. 6 and FIG. 7 depict example code blocks 600 and 700, respectively, in accordance with some implementations of the present disclosure. The executable code 118 may include the code block 600, and the executable code with modified first one or more branch instructions 120A may include the code block 700. Each code block 600, 700 may include one or more executable instructions. For example, the code blocks 600, 700 may include assembly code.

As can be seen in FIG. 6 and FIG. 7, each code block 600, 700 may include a respective move instruction 602, 702 which may move data from the EBX register to the EAX register. Each code block 600, 700 may also include a respective compare instruction 604, 704 which may compare the data in the EAX register to the data in the ECX register. The code block 600 may include a jump-if-equal instruction 606, which may jump to the section of code labeled "malicious_code" if the data in the EAX register and the data in the ECX register match, and thus, perform one or more malicious operations 608. Otherwise, execution may continue past the jump-if-equal instruction 606. The code block 700, on the other hand, may include a jump-if-not-equal instruction 706, instead of the jump-if-equal instruction 606. This may be responsive to the jump-if-equal instruction 606 being part of the first one or more branch instructions that are modified in block 222 of the method 200. The jump-if-not-equal instruction 706 may jump to the section of code labeled "malicious_code" if the data in the EAX register and the data in the ECX register do not match, and thus, perform one or more malicious operations 708. Otherwise, execution may continue past the jump-if-not-equal instruction 706.

FIG. 8 is a flowchart illustrating one embodiment of a method 800 for detecting malware by modifying executable code, in accordance with some implementations of the present disclosure. A processing device, having one or more CPU(s), one or more GPU(s), and/or memory devices communicatively coupled to the one or more CPU(s) and/or GPU(s) can perform the method 800 and/or one or more of the method's 800 individual functions, routines, subroutines, or operations. In certain implementations, a single processing thread can perform the method 800. Alternatively, two or more processing threads can perform the method 800, each thread executing one or more individual functions, routines, subroutines, or operations of the method. In an illustrative example, the processing threads implementing the method 800 can be synchronized (e.g., using semaphores, critical sections, and/or other thread synchronization mechanisms). Alternatively, the processing threads implementing the method 800 can be executed asynchronously with respect to each other. Various operations of the method 800 can be performed in a different (e.g., reversed) order compared with the order shown in FIG. 8. Some operations of the method 800 can be performed concurrently with other operations. Some operations can be optional. In one or more implementations, the malware detection manager 112 performs one or more of the operations of the method 800.

At block 810, processing logic identifies executable code. The executable code can include one or more branch instructions. The executable code may include the executable code 118. Block 810 may include functionality similar to the functionality of block 210 of the method 200 of FIG. 2.

At block 820, processing logic determines whether any of the one or more branch instructions of the executable code 118 mask maliciousness of the executable code 118. The determining operation of block 820 may include, at block 822, generating multiple modified copies of the executable code 118. Generating the modified copies may include modifying, for each modified copy of the executable code, one or more of the branch instructions of the executable code. The multiple modified copies of the executable code may be referred to herein as the executable code with modified branch instructions 120A-N. A first modified copy's modified one or more branch instructions may be different than another copy's modified one or more branch instructions, as discussed above. Block 822 may include functionality similar to the functionality of block 222 of the method 200.

In some implementations, modifying, for each modified copy of the executable code of the multiple modified copies of the executable code, the one or more branch instructions of the executable code 118 includes randomly selecting, for each modified copy of the executable code, the respective one or more branch instructions from the branch instructions of the executable code 118. Modifying a branch instruction may include changing a jump-if-equal instruction to a jump-if-not-equal instruction (or vice versa), changing a jump-if-zero instruction to a jump-if-not-zero instruction (or vice versa), changing a jump-if-overflow instruction to a jump-if-not-overflow instruction (or vice versa), or may include other changes as discussed herein.

At block 824, processing logic causes the execution of the multiple modified copies of the executable code—each modified copy with its respective modified one or more branch instructions—in multiple testing environments 116A-N. For example, each modified copy of the executable code may execute in a respective testing environment 116A-N of the testing environment subsystem 114. A testing environment 116A of the multiple testing environments 116A-N may include a VM. Block 824 may include functionality similar to the functionality of block 224 of the method 200.

At block 826, processing logic evaluates results of the execution of the multiple modified copies of the executable code with the respective modified one or more branch instructions. The results can indicate whether the executable code is malicious. Block 826 may include functionality similar to the functionality of block 226 of the method 200.

At block 830, processing logic determines whether any of the results of block 826 indicates that the branch instructions mask the maliciousness of the executable code 118. This may include the result of block 826 detecting one or more malicious operations. Block 830 may include functionality similar to block 230 of the method 200. Responsive to determining that the branch instructions of the executable code 118 mask the maliciousness of the executable code 118, processing logic, at block 840, performs one or more preventative actions with respect to the executable code 118. Block 840 may include functionality similar to block 840 of the method 200.

In some implementations, the malware detection manager 112 causes execution of the original executable code 118, without many modifications, to determine whether the executable code 118 is malicious. The executable code 118, in some cases, may not mask its malicious, or may do a poor job of masking its maliciousness. Processing logic may cause execution of the executable code 118, without any modifications, in a testing environment 116, which may include functionality similar to block 824. Processing logic may evaluate a result of the execution of the executable code 118, the result indicating whether the executable code 118 is malicious, which may include functionality similar to block 826. Responsive to the result indicating that the executable code 118 is malicious, processing logic may perform one or more preventative actions with respect to the executable code 118, which may include functionality similar to block 840. In one implementation, processing logic may cause the execution of the unmodified executable code 118 in the testing environment prior to generating the multiple modified copies of the executable code 120A-N or causing execution of the multiple modified copies of the executable code 120A-N.

Figure 9:
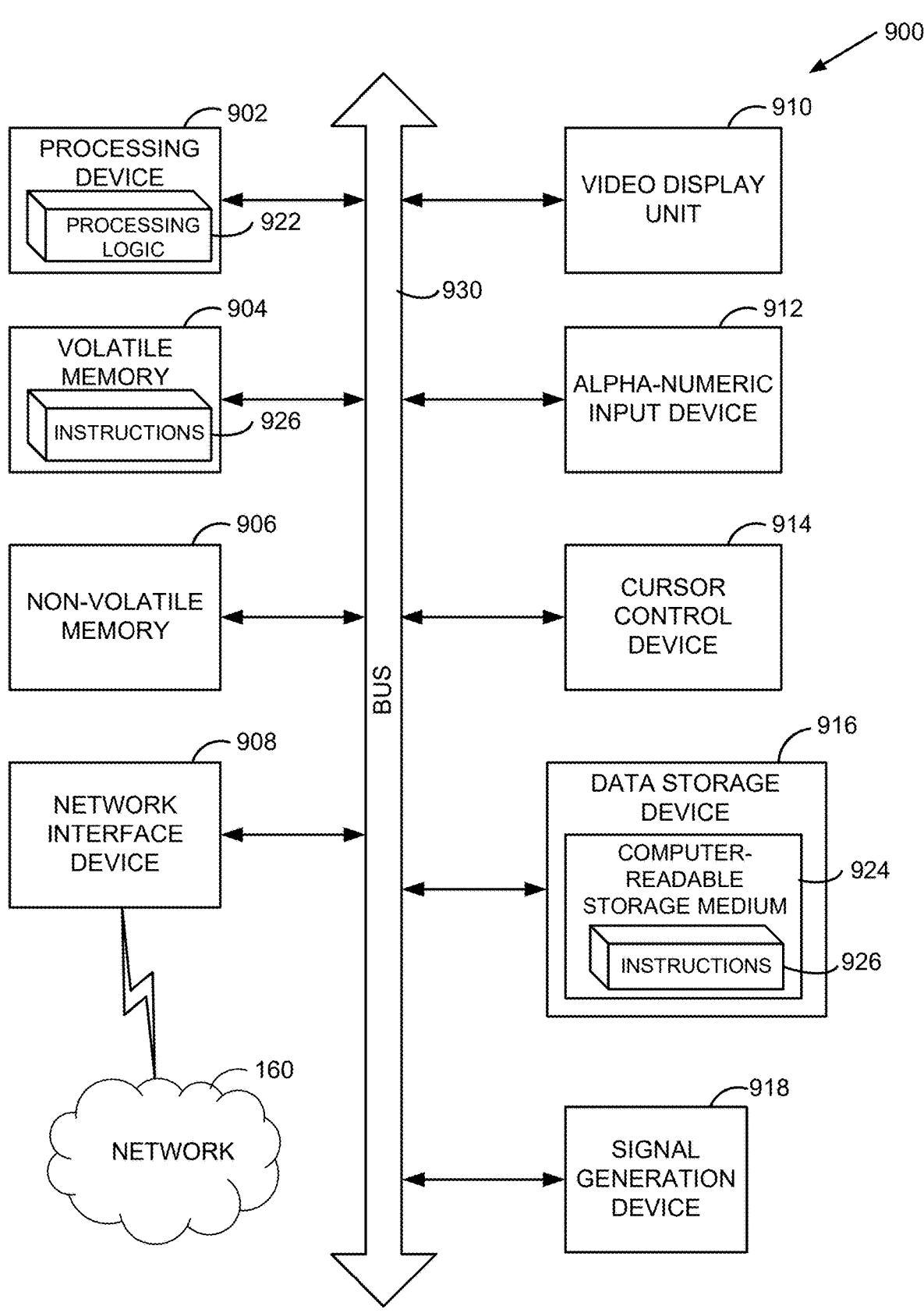
FIG. 9 is a block diagram of an example computer device capable of detecting malware by modifying executable code, in accordance with some implementations of the present disclosure.

FIG. 9 is a block diagram illustrating an example computer system 900, in accordance with implementations of the present disclosure. The computer system can be a computing device or other device discussed herein. The computer system 900 can be the malware detection system 110, the malware detection manager 112, the testing environment subsystem 114, or some other component of FIG. 1. The computer system 900 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a volatile memory 904 (e.g., read-only memory (ROM), flash memory, dynamic random access memory (DRAM) such as synchronous DRAM (SDRAM), double data rate (DDR SDRAM), or DRAM (RDRAM), etc.), a non-volatile memory 906 (e.g., flash memory, static random access memory (SRAM), etc.), and a data storage device 916, which communicate with each other via a bus 930.

The processing device 902 represents one or more general-purpose processing devices such as a microprocessor, CPU, GPU, or the like. More particularly, the processing device 902 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 902 can also be one or more special-purpose processing devices such as an ASIC, a field programmable gate array (FPGA), a digital signal processor (DSP), network processor, or the like. The processing device 902 is configured to execute instructions 926 (e.g., for performing one or more of the methods 200 or 800) for performing the operations discussed herein.

The computer system 900 can further include a network interface device 908. The network interface device 908 can assist in data communication between computing devices. The computer system 900 also can include a video display unit 910 (e.g., a liquid crystal display (LCD) or a cathode ray tube (CRT)), an input device 912 (e.g., a keyboard, and alphanumeric keyboard, a motion sensing input device, touch screen), a cursor control device 914 (e.g., a mouse), and a signal generation device 918 (e.g., a speaker).

The data storage device 916 can include a non-transitory machine-readable storage medium 924 (sometimes referred to as a "computer-readable storage medium") on which is stored one or more sets of instructions 926. The instructions may embody any one or more of the methodologies or functions described herein. The instructions 926 can also reside, completely or at least partially, within the volatile memory 904 and/or within the processing device 902 during execution thereof by the computer system 900, the volatile memory 904 and the processing device 902 also constituting machine-readable storage media. The instructions 926 can further be transmitted or received over a network 920 via the network interface device 908.

In one implementation, the instructions 926 include instructions for detecting malware by modifying executable code. While the computer-readable storage medium 924 (machine-readable storage medium) is shown in an example implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure can be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "identifying", "modifying", "causing," "evaluating", "performing", "changing", "selecting", "obtaining", "providing", "receiving", "displaying", "moving", "adjusting", "replacing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods 200 and 800 are depicted and described herein as a series of acts. However, acts in accordance with this disclosure can occur in various orders and/or concurrently, and with other acts not presented and described herein. Furthermore, not all illustrated acts can be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus can be constructed for the intended purposes, or it can comprise a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation," "an implementation," "some implementations," "one embodiment," "an embodiment," or "some embodiments" mean that a particular feature, structure, or characteristic described in connection with the implementation or embodiment is included in at least one implementation or embodiment. Thus, the appearances of the phrase "in one implementation" or "in an implementation" or other similar terms in various places throughout this specification are not necessarily all referring to the same implementation. In addition, the term "or" is intended to mean an inclusive "or" rather than an exclusive "or." Moreover, the word "example" or a similar term are used herein to mean serving as an example, instance, or illustration. Any aspect or design described herein as an "example" is not necessarily to be construed as preferred or advantageous over other aspects or designs. Rather, use of the word "example" or a similar term is intended to present concepts in a concrete fashion.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:

identifying executable code comprising branch instructions;

determining whether any of the branch instructions of the executable code mask maliciousness of the executable code, wherein the determining comprises:

modifying first one or more of the branch instructions of the executable code to alter execution behavior of the executable code, causing execution of the executable code with the modified first one or more branch instructions in a first testing environment, and evaluating a result of the execution of the executable code with the modified first one or more branch instructions, the result indicating whether the executable code is malicious; and responsive to determining that the branch instructions of the executable code mask the maliciousness of the executable code, performing one or more preventative actions with respect to the executable code.

2. The method of claim 1, wherein the branch instructions comprise a jump instruction.

3. The method of claim 2, wherein:

the jump instruction comprises a jump-if-equal instruction; and modifying the first one or more branch instructions of the executable code comprises changing the jump-if-equal instruction to a jump-if-not-equal instruction.

4. The method of claim 2, wherein:

the jump instruction comprises a jump-if-overflow instruction; and modifying the first one or more branch instructions of the executable code comprises changing the jump-if-over-flow instruction to a jump-if-not-overflow instruction.

5. The method of claim 1, wherein:

the branch instructions comprise a call instruction; and modifying the first one or more branch instructions of the executable code comprises changing the call instruction to a no operation instruction.

6. The method of claim 1, wherein:

the branch instructions comprise a return instruction; and modifying the first one or more branch instructions of the executable code comprises changing a return address of the return instruction.

7. The method of claim 1, wherein modifying the first one or more branch instructions of the executable code comprises randomly selecting the first one or more branch instructions from the branch instructions of the executable code.

8. The method of claim 1, wherein the first testing environment comprises a virtual machine.

9. The method of claim 1, wherein the determining further comprises:

modifying second one or more of the branch instructions of the executable code, wherein the modified first one or more branch instructions and the modified second one or more branch instructions include different branch instructions;

causing execution of the executable code with the modified second one or more branch instructions in a second testing environment; and evaluating a second result of the execution of the executable code with the modified second one or more branch instructions, the second result indicating whether the executable code is malicious.

10. A system, comprising:

a memory; and a processing device, coupled to the memory, configured to perform operations, comprising:

identifying executable code comprising branch instructions;

determining whether any of the branch instructions of the executable code mask maliciousness of the executable code, wherein the determining comprises:

modifying first one or more of the branch instructions of the executable code to alter execution behavior of the executable code, causing execution of the executable code with the modified first one or more branch instructions in a first testing environment, and evaluating a result of the execution of the executable code with the modified first one or more branch instructions, the result indicating whether the executable code is malicious; and responsive to determining that the branch instructions of the executable code mask the maliciousness of the executable code, performing one or more preventative actions with respect to the executable code.

11. The system of claim 10, wherein:

the branch instructions comprise a jump instruction; and modifying the first one or more branch instructions of the executable code comprises replacing the jump instruction with a complementary version of the jump instruction.

12. The system of claim 10, wherein the executable code comprises at least one of:

a portion of an email attachment;

a portion of a file stored in a cloud-based content management platform; or a portion of a file downloaded using a web browser.

13. The system of claim 10, wherein the operations further comprise:

identifying a malware monitoring detection subroutine of the executable code, wherein the malware monitoring detection subroutine is associated with a branch instruction of the first one or more branch instructions;

modifying a return instruction of the malware monitoring detection subroutine; and causing execution of the executable code, in a second testing environment, with the modified return instruction.

14. The system of claim 10, wherein the operations further comprise:

calculating a first code coverage of the executable code by causing execution of the executable code in the first testing environment;

calculating a second code coverage of the executable code with the modified first one or more branch instructions; and responsive to the second code coverage exceeding the first code coverage, modifying second one or more branch instructions of the executable code with the modified first one or more branch instructions.

15. The system of claim 14, wherein the operations further comprise:

causing execution of the executable code with the modified first one or more branch instructions and the modified second one or more branch instructions in the first testing environment; and evaluating a result of the execution of the executable code with the modified first one or more branch instructions and the modified second one or more branch instructions, the result indicating whether the executable code is malicious.

16. The system of claim 14 wherein the modified second one or more branch instructions do not include any of the modified first one or more branch instructions.

17. A method, comprising:

identifying executable code comprising branch instructions;

determining whether any of the branch instructions of the executable code mask maliciousness of the executable code, wherein the determining comprises:

generating a plurality of modified copies of the executable code by modifying, for each modified copy of the executable code, one or more of the branch instructions of the executable code to alter execution behavior of the executable code, causing execution of the plurality of modified copies of the executable code with respective modified one or more branch instructions in a plurality of testing environments, and evaluating results of the execution of the plurality of modified copies of the executable code with the respective modified one or more branch instructions, the results indicating whether the executable code is malicious; and responsive to determining that the branch instructions of the executable code mask the maliciousness of the executable code, performing one or more preventative actions with respect to the executable code.

18. The method of claim 17, wherein modifying, for each modified copy of the executable code of the plurality of modified copies of the executable code, the one or more of the branch instructions of the executable code comprises randomly selecting, for each modified copy of the executable code of the plurality of modified copies of the executable code, the respective modified one or more branch instructions from the branch instructions of the executable code.

19. The method of claim 17, wherein modifying the one or more of the branch instructions of the executable code comprises changing a jump-if-equal instruction to a jump-if-not-equal instruction.

20. The method of claim 17, wherein a testing environment of the plurality of testing environments comprises a virtual machine.

\* \* \* \* \*